(12) United States Patent
Lee et al.

(10) Patent No.: US 12,487,708 B2
(45) Date of Patent: Dec. 2, 2025

(54) ACTIVE PEN, TOUCH CONTROLLER, AND METHOD OF OPERATING ACTIVE PEN

(71) Applicant: Samsung Electronics Co., Ltd., Suwon-si (KR)

(72) Inventors: Choonghoon Lee, Suwon-si (KR); Kiup Kim, Suwon-si (KR); Seunghoon Baek, Suwon-si (KR); Yoonion Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/357,552

(22) Filed: Jul. 24, 2023

(65) Prior Publication Data
US 2024/0077975 A1 Mar. 7, 2024

(30) Foreign Application Priority Data
Sep. 7, 2022 (KR) .......................... 10-2022-0113783

(51) Int. Cl.
G06F 3/041 (2006.01)

(52) U.S. Cl.
CPC ...... *G06F 3/04182* (2019.05); *G06F 3/04162* (2019.05)

(58) Field of Classification Search
CPC ............... G06F 3/03545; G06F 3/0446; G06F 3/04166; G06F 3/0442; G06F 3/04162; G06F 3/0383; G06F 3/044; G06F 3/0416; G06F 3/04182
See application file for complete search history.

(56) References Cited

U.S. PATENT DOCUMENTS

| 10,606,389 | B2 | 3/2020 | Ju et al. |
| 11,137,840 | B1* | 10/2021 | Han .................... G06F 3/04166 |
| 11,144,140 | B2 | 10/2021 | Fleck et al. |
| 11,243,644 | B2 | 2/2022 | Ju et al. |
| 2017/0102826 | A1 | 4/2017 | Hamaguchi |
| 2018/0004353 | A1* | 1/2018 | Shin ....................... G02F 1/1343 |
| 2020/0050296 | A1* | 2/2020 | Fleck .................. G06F 3/03545 |

(Continued)

FOREIGN PATENT DOCUMENTS

| KR | 20200119739 A | 10/2020 |
| KR | 102299421 B1 | 9/2021 |

*Primary Examiner* — Sujit Shah
(74) *Attorney, Agent, or Firm* — Wolf, Greenfield & Sacks, P.C.

(57) ABSTRACT

An active pen adapted for use with a touch pad includes: a receiving circuit configured to generate an internal signal in response to modulating a received uplink signal, a first filter configured to generate a first sampling signal by sampling the internal signal at a first frequency, a second filter configured to generate a second sampling signal by sampling the internal signal at a second frequency unequal to the first frequency, and a timing information generating circuit configured to generate timing information associated with the uplink signal from the internal signal. The receiving circuit is also configured to receive the uplink signal at the first frequency in a first frame, and at the second frequency in a second frame. A noise power calculating circuit is also provided to calculate a noise power level of the uplink signal at each of the first and second frequencies, in response to the first and second sampling signals.

20 Claims, 12 Drawing Sheets

(56) References Cited

U.S. PATENT DOCUMENTS

| | | | |
|---|---|---|---|
| 2020/0333890 A1* | 10/2020 | Gur | G06F 3/038 |
| 2021/0019019 A1* | 1/2021 | Zhang | G06F 3/03545 |
| 2021/0089147 A1* | 3/2021 | Kim | G06F 3/03545 |
| 2021/0191562 A1* | 6/2021 | Han | G06F 3/04182 |
| 2021/0345361 A1 | 11/2021 | Hisano | |
| 2021/0397297 A1 | 12/2021 | Ding et al. | |
| 2022/0083169 A1 | 3/2022 | Katsurahira et al. | |
| 2022/0137768 A1 | 5/2022 | Lee | |
| 2022/0164081 A1* | 5/2022 | Lee | G06F 3/04162 |

\* cited by examiner

ACTIVE PEN, TOUCH CONTROLLER, AND METHOD OF OPERATING ACTIVE PEN

REFERENCE TO PRIORITY APPLICATION

This application claims priority under 35 U.S.C. § 119 to Korean Patent Application No. 10-2022-0113783, filed Sep. 7, 2022, the disclosure of which is hereby incorporated herein by reference.

BACKGROUND

The inventive concept relates to an active pen and a touch controller and, more particularly, to an active pen and a touch controller that are capable of communicating with each other, and a method of operating the active pen.

Touch panels are used in various electronic devices. A touch panel may provide a region, which a user of an electronic device may touch with their fingers and a pointer such as an electronic pen, and may include a plurality of electrodes configured to provide sensing signals according to touches. In addition, a touch screen controller may process the sensing signals received from the electrodes of the touch panel to detect the occurrence of touches and the positions of touches.

Touch sensing devices are capable of sensing a touch or pressure generated by a user's body part. In addition, users who are familiar with inputting information with writing instruments, or application programs (such as application programs for sketching or drawing) increasingly require electronic pens for inputting fine touches. Therefore, touch sensing devices are required to sense various inputs such as inputs generated through users' touches or by pressing, and inputs generated using electronic devices, such as pens.

SUMMARY

The inventive concept provides an active pen enabling communication at a low in-band noise level, a touch controller, and a method of operating the active pen.

According to an embodiment of the inventive concept, an active pen is provided that is adapted for use with a touch pad. The active pen includes: a receiving circuit configured to generate an internal signal in response to modulating a received uplink signal, a first filter configured to generate a first sampling signal by sampling the internal signal at a first frequency, a second filter configured to generate a second sampling signal by sampling the internal signal at a second frequency unequal to the first frequency, and a timing information generating circuit configured to generate timing information associated with the uplink signal from the internal signal. In some embodiments, the active pen may further include a third filter configured to generate a third sampling signal by sampling the internal signal at a third frequency, which is unequal to the first and second frequencies. The receiving circuit may also be configured to receive the uplink signal at the first frequency in a first frame, at the second frequency in a second frame, and at the third frequency in a third frame.

According to further embodiments, the active pen may include a noise power calculating circuit, which is configured to calculate a noise power level of the uplink signal at each of the first, second and third frequencies, in response to the first, second and third sampling signals. A transmitting circuit may also be provided, which is configured to: (i) receive information associated with the noise power level at a specific frequency among the first to third frequencies, from the noise power calculating circuit, and (ii) transmit the received information as a downlink signal to a device external to the active pen. In some embodiments, the noise power calculating circuit may be configured to select a frequency associated with a relatively greater noise power level from the first, second and third frequencies, and output information associated with the selected frequency.

According to another embodiment of the inventive concept, there is provided a touch controller including a transmitting circuit, a receiving circuit, and a touch processor. The transmitting circuit may be configured to transmit, to an active pen, an uplink signal having a first frequency in a first frame, an uplink signal having a second frequency in a second frame, and an uplink signal having a third frequency in a third frame. The receiving circuit is configured to receive a downlink signal including information on a noise power level at a specific frequency. The touch processor may be configured to control the transmitting circuit based on the information on a noise power level such that an uplink signal having a frequency that is different from the first to the third frequencies may be transmitted in a frame after the first to the third frames.

According to another embodiment of the inventive concept, there is provided a method of operating an active pen, which includes receiving a first uplink signal having a first frequency, calculating a power level of noise occurring in the first uplink signal, receiving a second uplink signal having a second frequency, calculating a power level of noise occurring in the second uplink signal, receiving a third uplink signal having a third frequency, and calculating a power level of noise occurring in the third uplink signal.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Hereinafter, embodiments will be described with reference to the accompanying drawings.

Figure 1:
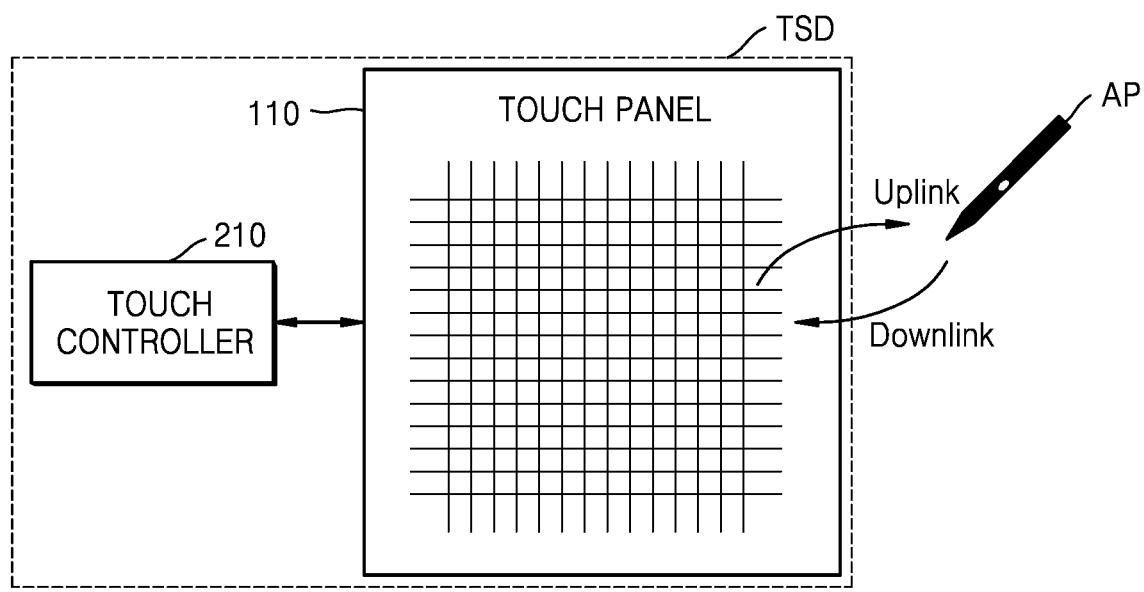
FIG. 1 is a conceptual view illustrating communication between a touch sensing device and an active pen according to an embodiment.

FIG. 1 is a conceptual view illustrating communication between a touch sensing device TSD and an active pen AP according to an embodiment. Referring to FIG. 1, the touch sensing device TSD may bidirectionally communicate with the active pen AP. The active pen AP may provide information relating to touches when the active pen AP touches the touch sensing device TSD. In addition, the active pen AP may receive information from the touch sensing device TSD and may provide information not relating to touches to the touch sensing device TSD. For example, the active pen AP may include various components such as an input button, a transceiver, a logic circuit, a memory, and the like.

A signal which is provided from the touch sensing device TSD to the active pen AP may be referred to as an uplink signal, and a time period during which the touch sensing device TSD provides an uplink signal may be referred to as an "uplink time period" or more simply as an "uplink period." A signal which is provided from the active pen AP to the touch sensing device TSD may be referred to as a downlink signal, and a time period during which the active pen AP provides a downlink signal may be referred to as a "downlink time period" or more simply as a "downlink period."

The touch sensing device TSD may include a touch panel 110 and a touch controller 210. The touch controller 210 may generate an uplink signal for communication with the active pen AP, and the uplink signal may be transmitted to the active pen AP using a capacitive coupling method through a plurality of touch sensors arranged in the touch panel 110. In addition, the active pen AP may generate a downlink signal for communication with the touch controller 210, and the downlink signal may be transmitted to the touch sensing device TSD using a capacitive coupling method through the touch sensors arranged in the touch panel 110.

For example, the uplink signal may include information such as panel information or a protocol version, but is not limited thereto. The downlink signal may include a synchronization signal or information about the state of the active pen AP. For example, the downlink signal may include information about the coordinate of the active pen AP, information about a battery of the active pen AP, information about the tilt angle of the active pen AP, and/or various pieces of information stored in the active pen AP, but is not limited thereto.

The touch controller 210 and the active pen AP may communicate with each other in units of frames or packets. In one embodiment, an uplink signal may include a plurality of uplink signals that are transmitted at different frequencies. For example, within a first frame, a first uplink signal having a first frequency may be transmitted to the active pen AP, and in a second frame, a second uplink signal having a second frequency may be transmitted to the active pen AP. The first uplink signal and the second uplink signal may include the same information, but may be provided at different frequencies. Therefore, the active pen AP and the touch controller 210 of the inventive concept may reduce the influence of noise on communication even when a substantial amount of noise is present in an uplink signal having a specific frequency.

Alternatively, for example, within one frame, the touch controller 210 may transmit a plurality of uplink signals having different frequencies to the active pen AP. That is, within one frame, a first uplink signal having a first frequency and a second uplink signal having a second frequency may be transmitted to the active pen AP.

Figure 2:
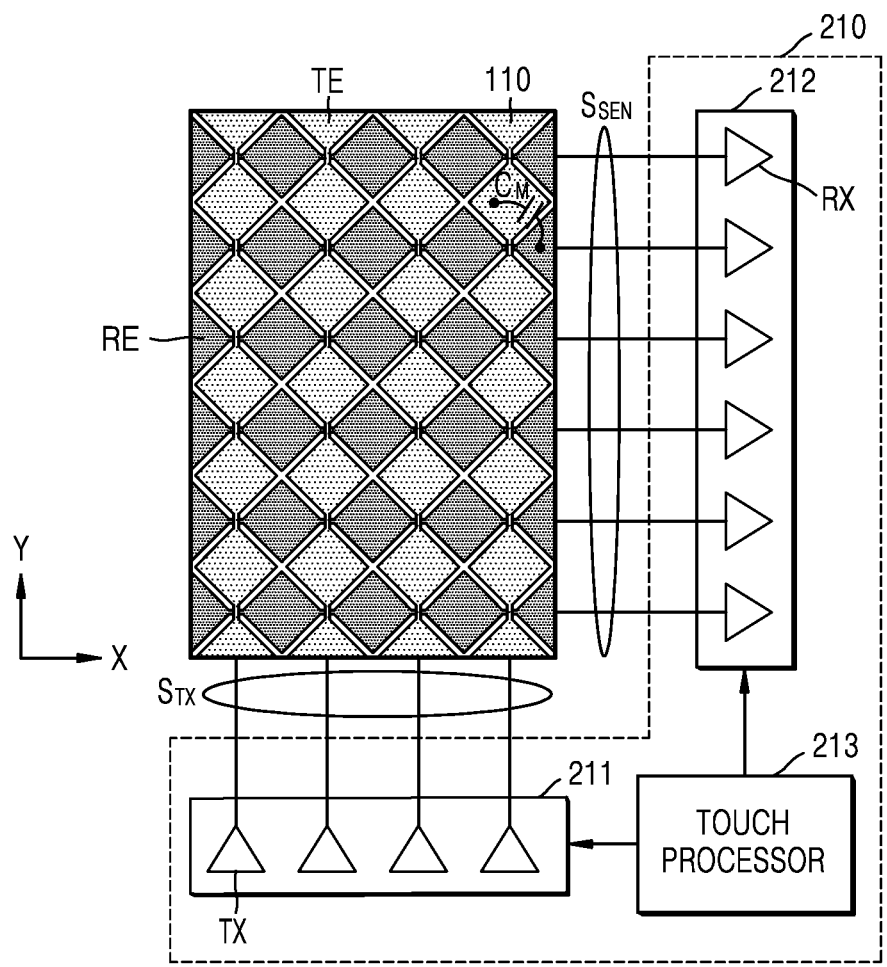
FIG. 2 is a view illustrating a touch panel and a touch controller according to an embodiment.

FIG. 2 is a view illustrating a touch panel 110 and a touch controller 210 according to an embodiment. Referring to FIG. 2, the touch panel 110 and the touch controller 210 may form a touch sensing device, such as the touch sensing device TSD shown in FIG. 1. The touch panel 110 may include a plurality of driving electrodes TE and a plurality of receiving electrodes RE, and the plurality of driving electrodes TE and the plurality of receiving electrodes RE may be referred to as a plurality of touch electrodes, a plurality of sensing electrodes, or a plurality of sensing units. In an embodiment, the receiving electrodes RE may extend in a first direction (for example, an X-axis direction), and the driving electrodes TE may extend in a second direction (for example, a Y-axis direction). The first direction and the second direction may be orthogonal to each other, and the receiving electrodes RE and the driving electrodes TE may cross each other. Mutual capacitance CM may be formed between each driving electrode TE and adjacent receiving electrodes RE.

Unit electrodes of the touch electrodes, that is, the driving electrodes TE and/or the receiving electrodes RE, may have a specific shape, such as a rhombus shape as shown in FIG. 2, or a pattern to improve touch sensing characteristics (e.g., touch sensing sensitivity. However, the inventive concept is not limited thereto. In addition, the touch controller 210 may include a transmitting circuit 211, a receiving circuit 212, and a touch processor 213. The transmitting circuit 211 may include a plurality of transmitters TX, and the transmitters TX may provide a driving signal $S_{TX}$ to the driving electrodes TE. In an embodiment, the transmitting circuit 211 may further include an encoder, and the encoder may be implemented separately from the transmitting circuit 211. The receiving circuit 212 may include a plurality of receivers RX, and the receivers RX may receive a sensing signal $S_{SEN}$ from the receiving electrodes RE. In an embodiment, the receiving circuit 212 may further include a decoder, and the decoder may be implemented separately from the receiving circuit 212. The transmitting circuit 211 may also be referred to as a driving circuit, and the receiving circuit 212 may also be referred to as a sensing (detection) circuit.

According to an embodiment, in an uplink time period for communication between the touch controller 210 and an active pen, such as the active pen AP shown in FIG. 1, a driving signal $S_{TX}$ may include an uplink signal, and the transmitters TX may provide the uplink signal to the driving electrodes TE. The transmitting circuit 211 may output uplink signals having different frequencies. For example, during a first frame, the transmitting circuit 211 may transmit a first uplink signal having a first frequency, and in a second frame, the transmitting circuit 211 may transmit a second uplink signal having a second frequency different from the first frequency. Uplink periods for communication between the touch controller 210 and the active pen AP will be described later with reference to FIGS. 3A and 3B. Alternatively, a first uplink signal having a first frequency and a second uplink signal having a second frequency may be transmitted within one frame, for example.

The sensing signal $S_{SEN}$ may represent mutual capacitance CM between the driving electrodes TE to which the driving signal $S_{TX}$ is applied and the receiving electrodes RE from which the sensing signal $S_{SEN}$ is received. For example, when the touch panel 110 is touched at a point, the mutual capacitance CM may decrease at the point, and the level of the sensing signal $S_{SEN}$ may decrease or increase compared to the quiescent level of the sensing signal $S_{SEN}$ before the touch occurs. The receivers RX may generate a plurality of sensing values through amplification and analog-to-digital conversion of the sensing signal $S_{SEN}$.

In an embodiment, the receiving circuit 212 may receive a downlink signal from the active pen AP. The downlink signal may include information on a frequency domain used for communication between the touch controller 210 and the active pen AP. For example, the downlink signal may include information about noise of an uplink signal having a specific frequency.

Unlike the embodiment shown in FIG. 2, the touch panel 110 may include a plurality of sensing electrodes each operating as a driving electrode and a sensing electrode. The sensing electrodes may be arranged in a matrix, and each of the sensing electrodes may be referred to as a "dot sensor." Transmitters and receivers may be integrated to provide a driving signal to each of the dot sensors and receive a sensing signal from each of the dot sensors.

The touch processor 213 may control the overall operation of the touch controller 210. For example, the touch processor 213 may control the operational timing of the transmitting circuit 211 and the receiving circuit 212. In addition, the touch processor 213 may calculate the occurrence, location, and intensity (pressure) of a touch based on a plurality of sensing values or a plurality of touch values received from the receiving circuit 212.

In an embodiment, the touch processor 213 may obtain information about noise of an uplink signal at a specific frequency as feedback from a downlink signal received through the receiving circuit 212. Based on the information about noise, which is advantageously provided as feedback via the active pen AP, the touch processor 213 may identify a frequency at which a relatively large amount of noise occurs among different frequencies of uplink signals, and may change the frequency to an updated frequency likely to have less noise. Thereafter, the touch processor 213 may control the transmitting circuit 211 to generate an uplink signal having the updated frequency.

Figure 3A:
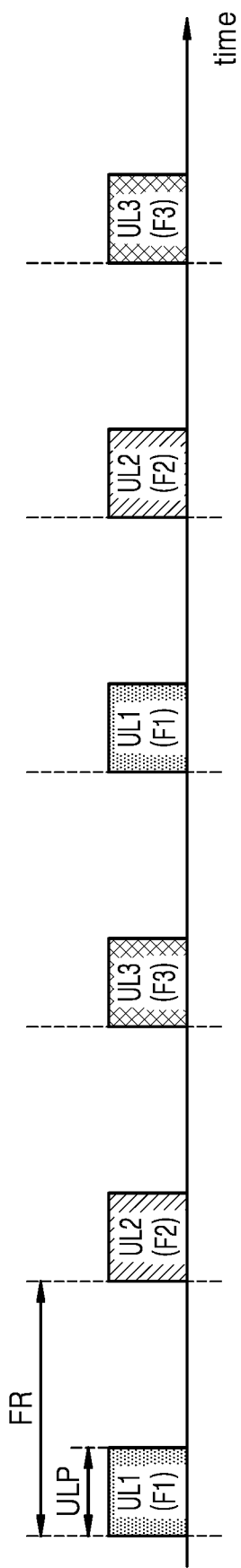
FIGS. 3A and 3B are timing diagrams illustrating uplink signal communication between the touch controller and the active pen according to embodiments.
Figure 3B:
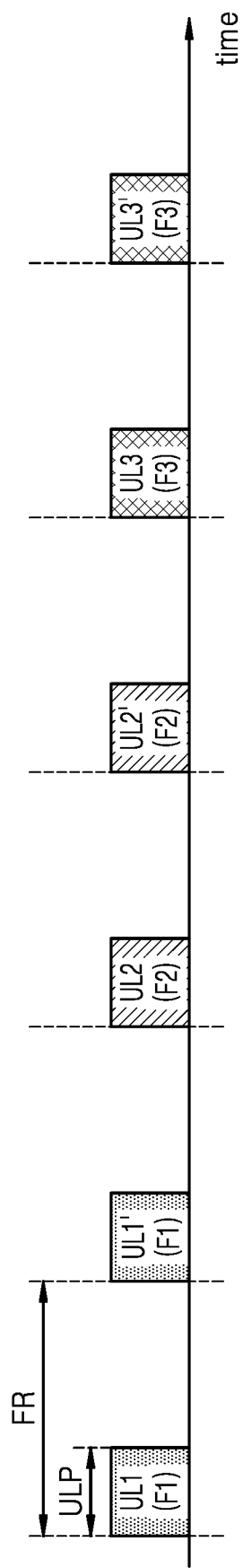

FIGS. 3A and 3B are timing diagrams illustrating uplink signal communication between the touch controller 210 and the active pen AP according to embodiments. The timing diagrams shown in FIGS. 3A and 3B may represent communications based on a universal stylus initiative (USI) pen protocol that is an example of protocols for the active pen AP. In an embodiment, the touch sensing device TSD and the active pen AP may be referred to as "USI systems." Hereinafter, embodiments will be described mainly with reference to the USI pen protocol. However, embodiments may also be applied to other protocols such as Microsoft pen protocol (MPP). FIGS. 3A and 3B are diagrams illustrating examples in which the frequency or phase of an uplink varies according to frames FR. However, the touch controller 210 and the active pen AP of the inventive concept are not limited thereto. For example, in an alternative embodiment, in one frame FR, the touch controller 210 may transmit a plurality of uplink signals having different frequencies or phases to the active pen AP.

Referring to FIGS. 1 and 3A, the touch controller 210 and the active pen AP may communicate with each other in units of frames FR. One frame FR may include an uplink time period ULP and a downlink time period after the uplink time period ULP. Communication between the touch controller 210 and the active pen AP may be performed through a plurality of frames, and each frame may include an uplink time period and a downlink time period. For example, one frame may be set to have a frequency of 60 Hz, but is not limited thereto.

During a respective uplink time period ULP, the touch controller 210 may transmit an uplink signal to the active pen AP. In this case, the uplink signal may be a phase-shift keying (PSK) signal. For example, the uplink signal may be a differential binary PSK (DBPSK) signal. Therefore, the uplink signal may transmit data related to the operation of the active pen AP.

In a first frame, the touch controller 210 may transmit a first uplink signal UL1 having a first frequency F1, and in a second frame following the first frame, the touch controller 210 may transmit a second uplink signal UL2 having a second frequency F2, wherein the second frequency F2 is different from the first frequency F1. For example, the first frequency F1 may be 270 kHz, and the second frequency F2 may be 300 kHz. The touch controller 210 may transmit a third uplink signal UL3 having a third frequency F3 in a third frame following the second frame. The third frequency F3 may be different from the first frequency F1 and the second frequency F2. For example, the third frequency F3 may be 330 kHz, but the first to third frequencies F1 to F3 are not limited thereto. The first to third uplink signals UL1 to UL3 may include the same information and may have different frequencies.

After the third frame, the touch controller 210 may transmit the first uplink signal UL1 having the first frequency F1 in a fourth frame, the second uplink signal UL2 having the second frequency F2 in a fifth frame, and the third uplink signal UL3 having the third frequency F3 in a sixth frame. However, unlike in the example shown in FIG. 3A, the touch controller 210 may transmit uplink signals having two, four, or more different frequencies alternately in frames.

Each of the first, second and third uplink signals may be a beacon signal and may contain various pieces of information. For example, the uplink signals may include frequency information, active pen configuration information, and the like, and may further include a preamble code, a command identification (ID), and the like. The preamble code may be a code for synchronizing transmission timing between the touch controller 210 and the active pen AP. The command ID may be data from the touch controller 210 to the active pen AP, and may include a code for assigning an ID to the active pen AP, a code for changing a frequency for communication with the active pen AP, a code for indicating the completion of pairing between the touch controller 210 and the active pen AP, and the like.

In an embodiment, the touch controller 210 may communicate with a plurality of different active pens APs. The first to third uplink signals UL1 to UL3 may be transmitted to each of the plurality of active pens APs, and in this case, uplink signals having different command IDs may be respectively transmitted to the plurality of active pens APs.

After the active pen AP normally receives an uplink signal that is a beacon signal, the active pen AP may transmit a downlink signal (for example, an acknowledgement (ACK) signal) to the touch sensing device TSD in a corresponding downlink time period, and may extract information from the beacon signal. In some embodiments, the active pen AP may transmit a downlink signal, which contains information about noise occurring at a specific frequency among a plurality of frequencies of uplink signals.

Referring to FIGS. 1 and 3B, in a first frame, the touch controller 210 may transmit a first uplink signal UL1 having a first frequency F1, and in a second frame following the first frame, the touch controller 210 may transmit a first uplink signal UL1' having the first frequency F1. In an embodiment, the first uplink signal UL1 in the first frame and the first uplink signal UL1' in the second frame may be out of phase with each other. For example, the first uplink signal UL1 in the first frame and the first uplink signal UL1' in the second frame may be formed such that reference sinusoidal waves of the first uplink signals UL1 and UL1' may have a phase difference of 180 degrees (for example, cos (reference phase) and −cos (opposite phase), respectively) or may have a phase difference of 90 degrees (for example, cos and −sin, respectively).

In a state in which the voltage of a driving signal (for example, the driving signal $S_{TX}$ shown in FIG. 2) of a transmitting circuit (for example, the transmitting circuit 211 shown in FIG. 2) is varied to transmit the first uplink signal UL1 in the first frame and the first uplink signal UL1' in the second frame, the output brightness of a display panel provided together with the touch panel 110 may be affected. In this case, issues such as perceptible flickering or screen shaking may occur. Therefore, the first uplink signal UL1 in the first frame and the first uplink signal UL1' in the second frame may be formed to be out of phase with each other to prevent issues such as flickering.

In a third frame, the touch controller 210 may transmit a second uplink signal UL2 having a second frequency F2 that is different from the first frequency F1, and in a fourth frame following the third frame, the touch controller 210 may transmit a second uplink signal UL2' having the second frequency F2. In an embodiment, the second uplink signal UL2 in the third frame and the second uplink signal UL2' in the fourth frame may be out of phase with each other. For example, reference sinusoidal waves of the second uplink signal UL2 in the third frame and the second uplink signal UL2' in the fourth frame may have a phase difference of 180 degrees or 90 degrees.

In a fifth frame, the touch controller 210 may transmit a third uplink signal UL3 having a third frequency F3 that is different from the first frequency F1 and the second frequency F2, and in a sixth frame following the fifth frame, the touch controller 210 may transmit a third uplink signal UL3' having the third frequency F3. In an embodiment, the third uplink signal UL3 in the fifth frame and the third uplink signal UL3' in the sixth frame may be out of phase with each other. For example, reference sinusoidal waves of the third uplink signal UL3 in the fifth frame and the third uplink signal UL3' in the sixth frame may have a phase difference of 180 degrees or 90 degrees.

The first to third uplink signals UL1 to UL3 and UL1' to UL3' may contain the same information (but out of phase relative to each other). However, unlike in the example shown in FIG. 3B, the touch controller 210 may transmit uplink signals having two, four, or more different frequencies alternately in frames.

Figure 4:
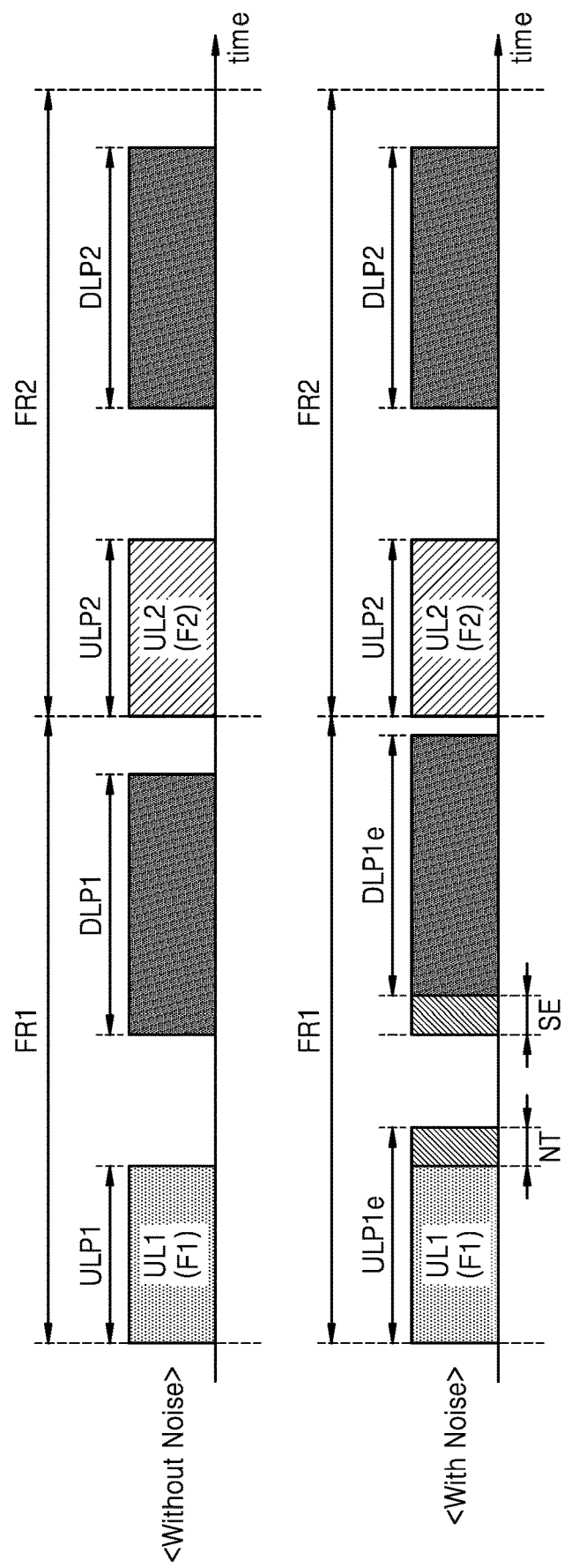
FIG. 4 is a timing diagram illustrating external noise at a specific frequency during signal communication between the touch controller and the active pen according to an embodiment.

FIG. 4 is a timing diagram illustrating external noise at a specific frequency during signal communication between the touch controller 210 and the active pen AP according to an embodiment. Although the following description provided with reference to FIG. 4 is based on the uplink signal transmission method described with reference to FIG. 3A, the inventive concept is not limited thereto, and the uplink signal transmission method described with reference to FIG. 3B may be applied in a similar manner.

Referring to FIGS. 1 and 4, the touch controller 210 and the active pen AP may communicate with each other in units of frames or packets. A first frame FR1 may include a first uplink period ULP1 and a first downlink period DLP1, and a second frame FR2 may include a second uplink period ULP2 and a second downlink period DLP2. In the first frame FR1, the touch controller 210 may transmit a first uplink signal UL1 having a first frequency F1, and in the second frame FR2 following the first frame FR1, the touch controller 210 may transmit a second uplink signal UL2 having a second frequency F2 that is different from the frequency F1.

For example, when noise occurs at the first frequency F1 in the first frame FR1, due to a noise period NT, the active pen AP may determine a time different from the actual end time of the first uplink signal UL1 as the end time of the first uplink signal UL1. Therefore, a first uplink period ULP1e determined by the active pen AP may be longer than the first uplink period ULP1 in which no noise occurs. Due to this, the active pen AP may transmit a downlink signal to the touch controller 210 in a first downlink period DLP1e having a start time that is delayed from the start time of the first downlink period DLP1 in which no noise occurs. Thus, there may be a synchronization error period SE in which a synchronization error occurs between the touch controller 210 and the active pen AP, as a result of noise.

The touch controller 210 and the active pen AP of the inventive concept are capable of transmitting and receiving uplink signals having a plurality of frequencies, and thus even when a synchronization error occurs between the touch controller 210 and the active pen AP due to noise at a specific frequency, the touch controller 210 and the active pen AP may communicate with each other through uplink signals having frequencies other than the specific/predetermined frequency. For example, even when noise occurs in the first uplink signal UL1 having the first frequency F1, communication is possible through the second uplink signal UL2 having the second frequency F2, and thus the influence of in-band noise at the first frequency F1 may be reduced. In addition, because the touch controller 210 and the active pen AP communicate with each other at preset frequencies, the influence of out-band noise may be reduced.

Figure 5:
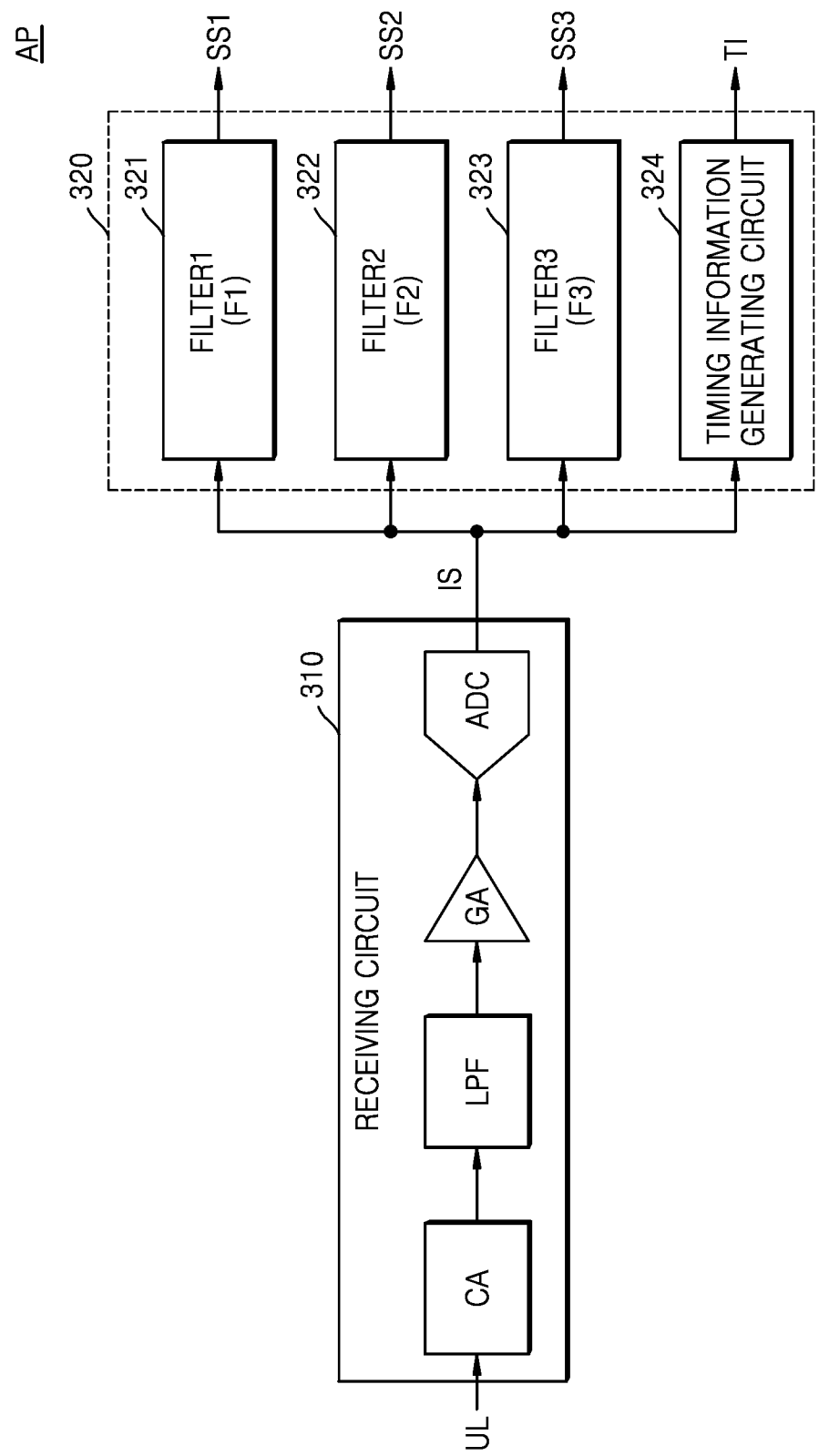
FIG. 5 is a view illustrating the active pen according to an embodiment.

Referring now to FIG. 5, an embodiment of the active pen AP may include a receiving circuit 310 and a plurality of filters 320. The active pen AP may include, for example, a pen electrode disposed on a tip of the active pen AP, and may transmit/receive signals through the pen electrode.

The receiving circuit 310 may receive an uplink signal UL from a touch sensing device (for example, the touch sensing device TSD shown in FIG. 1). As described above with reference to FIGS. 3A and 3B, the receiving circuit 310 may receive uplink signals ULs having different frequencies. The receiving circuit 310 may be referred to as an analog front end (AFE).

The receiving circuit 310 may include a current amplifier CA, a low pass filter LPF, a gain amplifier GA, and an analog-to-digital converter ADC. The receiving circuit 310 may modulate uplink signals UL into signals processible by a pen controller of the active pen AP. For example, the receiving circuit 310 may modulate an uplink signal UL into an internal signal IS that is processible by the filters 320, and then the receiving circuit 310 may output the internal signal IS to the plurality of filters 320.

The current amplifier CA may amplify the amount of current, which corresponds to the difference between a reference signal and a received signal (that is, an uplink signal UL) and may convert the amplified amount of current into sensing voltage. The low pass filter LPF may filter the frequency of the sensing voltage which is output from the current amplifier CA. For example, the low pass filter LPF may have a pass frequency band equal to or lower than a specific frequency. Thus, among frequency components of the sensing voltage, frequency components equal to or lower than the specific frequency may pass through the low pass filter LPF, and frequency components greater than the specific frequency may be blocked by the low pass filter LPF. For example, the low pass filter LPF may remove high-frequency noise from the sensing voltage.

The gain amplifier GA may amplify an output voltage that is output from the low pass filter LPF. For example, the gain amplifier GA may have a gain of a specific value and may output an amplified voltage by amplifying the magnitude of the output voltage by the specific value. The analog-to-digital converter ADC may generate an internal signal IS through analog-to-digital conversion of the amplified voltage.

The filters 320 may include, for example, first to third filters 321 to 323 and a timing information generating circuit 324. Each of the first to third filters 321 to 323 may be a filter for filtering a corresponding specific frequency component. The first filter 321 may generate a first sampling signal SS1 by sampling the internal signal IS at a first frequency F1, the second filter 322 may generate a second sampling signal SS2 by sampling the internal signal IS at a second frequency F2, and the third filter 323 may generate a third sampling signal SS3 by sampling the internal signal IS at a third frequency F3.

In an embodiment, each of the first to third filters 321 to 323 may operate as a discrete Fourier transform (DFT) filter. For example, each of the first to third filters 321 to 323 may be a Goertzel filter to which the Goertzel algorithm is applied. Although FIG. 5 illustrates that the filters 320 include the first to third filters 321 to 323 for filtering three different frequencies (i.e., first to third frequencies F1 to F3), the inventive concept is not limited thereto. The filters 320 may include two, four, or more filters for filtering at two, four, or more different frequencies.

The timing information generating circuit 324 may receive the internal signal IS to generate timing information TI. In this case, the timing information TI may be timing information about the uplink signal UL and may include information about the start time of the uplink signal UL, information on the end time of the uplink signal UL, information on the length of data length, and the like. For example, the timing information generating circuit 324 may sense a preamble code of the uplink signal UL.

In an embodiment, the timing information generating circuit 324 may be implemented as a sliding DFT filter. The timing information generating circuit 324 may sense a frequency change in a specific frequency domain. For example, the timing information generating circuit 324 may sense a frequency change in a frequency domain including the first to third frequencies F1 to F3.

Advantageously, because the active pen AP of the inventive concept includes the filters 320 configured to sample corresponding frequency components from the internal signal IS at different frequencies, even when in-band noise occurs at a specific frequency, the active pen AP may reliably communicate with the touch controller 210 through uplink signals having frequencies other than the specific frequency having excessive noise associated therewith.

Figure 6:
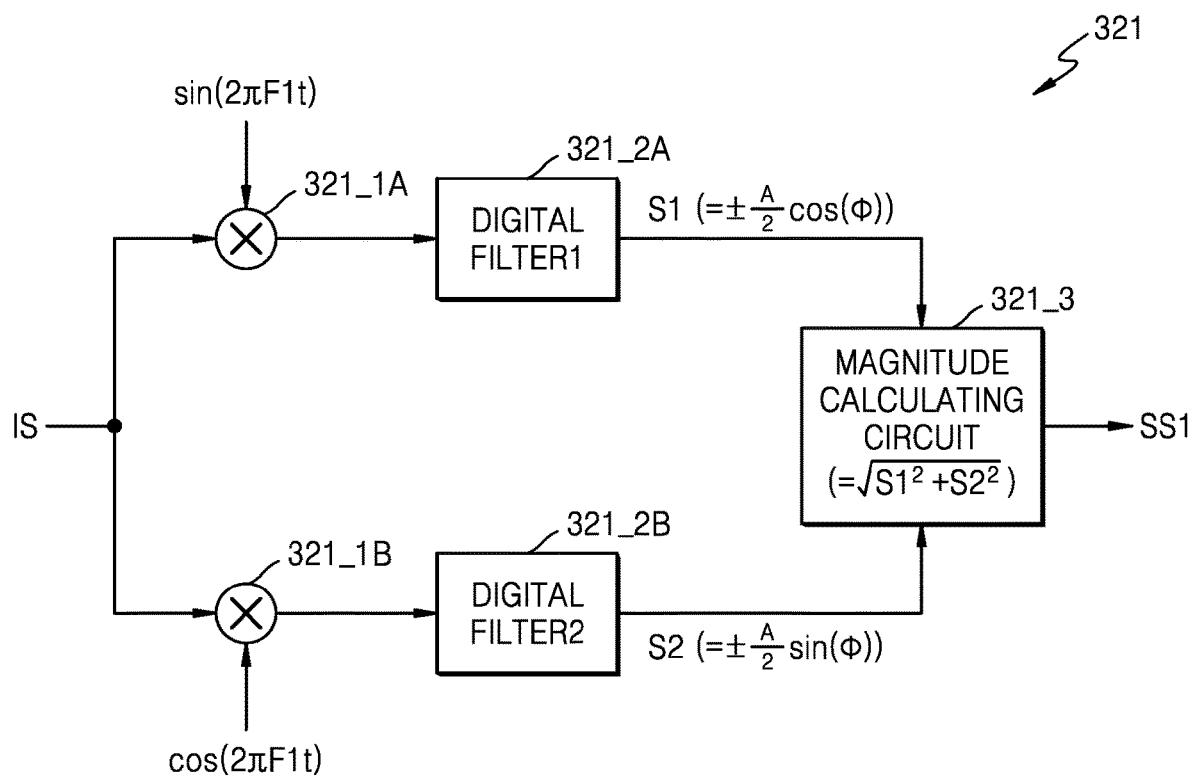
FIG. 6 is a view illustrating a configuration of a first filter of the active pen according to an embodiment.

FIG. 6 is a view illustrating an embodiment of the first filter 321 of the active pen AP (see, e.g., FIG. 5). This first filter 321 may be a DFT filter. The following description of the first filter 321 may be similarly applied to the second filter 322 and the third filter 333 shown in FIG. 5. The first filter 321 may include a first operation circuit 321_1A, a second operation circuit 321_1B, a first digital filter 321_2A, a second digital filter 321_2B, and a magnitude calculating circuit 321_3. In this case, the first operation circuit 321_1A and the first digital filter 321_2A may be defined as an I-phase signal path, and the second operation circuit 321_1B and the second digital filter 321_2B may be defined as a Q-phase signal path.

The first operation circuit 321_1A may perform an operation using an internal signal IS and $\sin(2\pi F1 t)$. In this case, F1 may refer to a first frequency F1 that is an uplink signal frequency. The first digital filter 321_2A may output a first signal S1 from results of the operation of the first operation circuit 321_1A. In this case, the first signal S1 may have a value of $\pm A/2 \cos(\phi)$, where A may refer to the amplitude of the internal signal IS and $\phi$ may refer to the phase of the internal signal IS.

The second operation circuit 321_1B may perform an operation using the internal signal IS and $\cos(2\pi F1 t)$. The second digital filter 321_2B may output a second signal S2 from results of the operation of the second operation circuit 321_1B. In this case, the second signal S2 may have a value of $\pm A/2 \sin(\phi)$.

The magnitude calculating circuit 321_3 may receive the first signal S1 and the second signal S2 to generate a first sampling signal SS1. For example, the magnitude calculating circuit 321_3 may generate the first sampling signal SS1 having an amplitude corresponding the amplitude of the internal signal IS by adding the square of the first signal S1 and the square of the second signal S2, and then calculating the square root of the sum. However, the components of the first filter 321 described above and the operations of the components described above are just examples, and the components of the first filter 321 may be variously modified in other embodiments of the invention.

Figure 7:
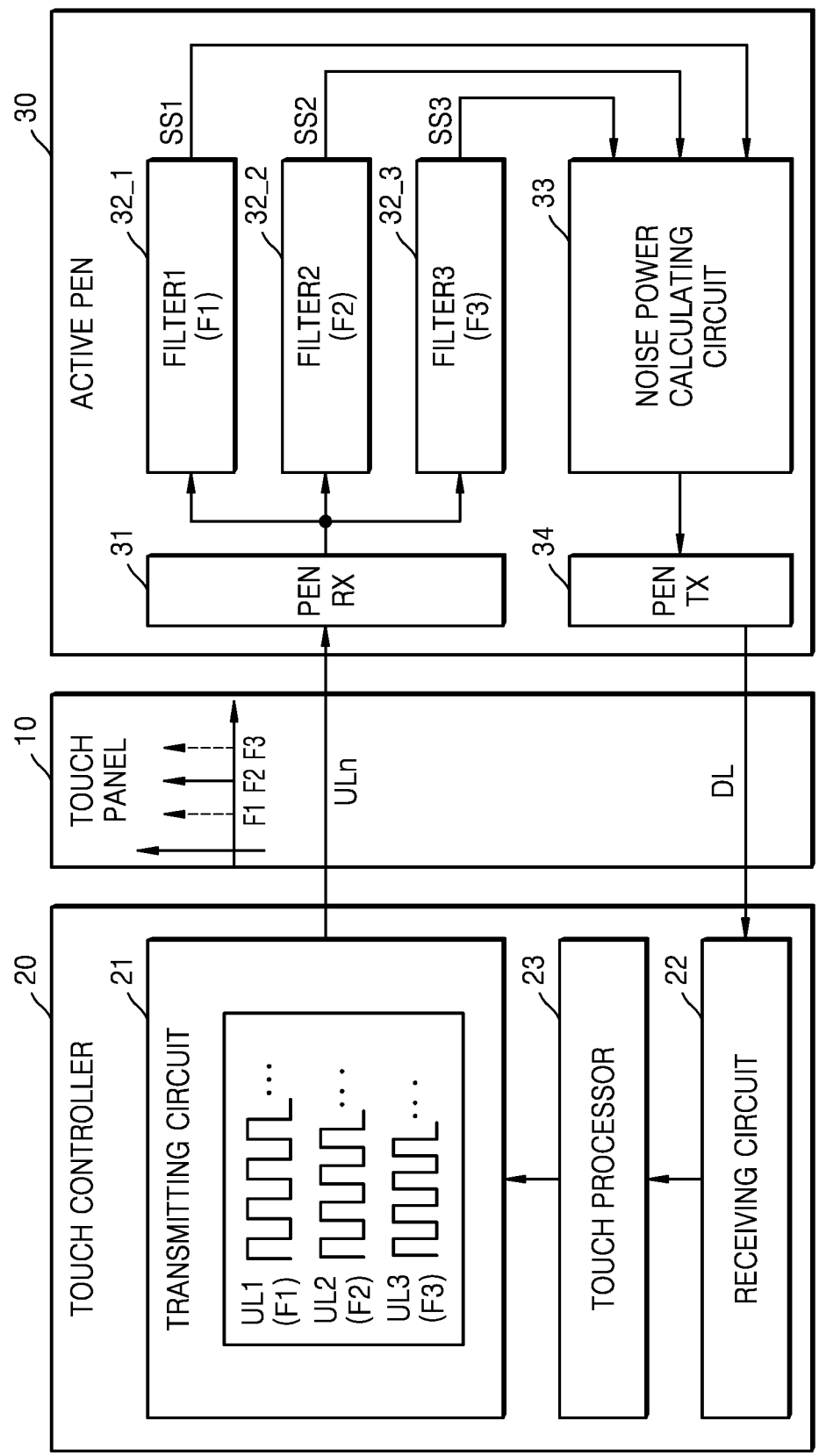
FIG. 7 is a view illustrating a touch panel, a touch controller, and an active pen according to an embodiment.

FIG. 7 is a view illustrating a touch panel 10, a touch controller 20, and an active pen 30 according to an embodiment. The touch panel 10, the touch controller 20, and the active pen 30 shown in FIG. 7 may be respectively the same as the touch panel 110, the touch controller 210, and the active pen AP described with reference to FIGS. 1 to 6. Referring to FIG. 7, the touch controller 20 may include a transmitting circuit 21, a receiving circuit 22, and a touch processor 23. The transmitting circuit 21 may correspond to the transmitting circuit 211 shown in FIG. 2, and the receiving circuit 22 may correspond to the receiving circuit 212 shown in FIG. 2.

The transmitting circuit 21 may generate a first uplink signal UL1 having a first frequency F1, a second uplink signal UL2 having a second frequency F2, and a third uplink signal UL3 having a third frequency F3, and may transmit the first uplink signal UL1, the second uplink signal UL2, and the third uplink signal UL3 to the active pen 30 through the touch panel 10. The first to third frequencies F1 to F3 may be different from each other, and the first, second and third uplink signals may be identified as ULn, where n=1, 2, 3 in the illustrated embodiment.

In an embodiment, the transmitting circuit 21 may transmit the first uplink signal UL1 in a first frame, the second uplink signal UL2 in a second frame, and the third uplink signal UL3 in a third frame. The first frame, the second frame, and the third frame may be consecutively arranged frames in a timeline sequence of frames. Alternatively, another frame may be provided between the first frame and the second frame, and another frame may be provided between the second frame and the third frame. Alternatively, in an embodiment, the transmitting circuit 21 may transmit the first uplink signal UL1, the second uplink signal UL2, and the third uplink signal UL3 within one frame.

The receiving circuit 22 may receive a downlink signal DL from the active pen 30. In some embodiments, the downlink signal DL may include information on a frequency domain used for communication between the touch controller 20 and the active pen 30. For example, the downlink signal DL may include information about noise of an uplink signal having a specific frequency.

A touch processor 23 is shown as extending between the receiving circuit 22 and the transmitting circuit 21. Advantageously, the touch processor 23 may obtain noise information at a specific uplink signal frequency (as feedback) via the downlink signal DL received through the receiving circuit 22; the touch processor 23 may then use the noise information to identify a frequency having a relatively large amount of noise (relative to the other frequencies), and may change the selected frequency to another frequency associated with a reduced amount of noise. The touch processor 23 may then control the transmitting circuit 21 to generate an uplink signal having the other selected frequency associated with a reduced amount of noise. For example, an uplink signal may be generated by replacing the second frequency F2 with a fourth frequency that is different from the first to third frequencies F1 to F3.

As shown by FIG. 7, the active pen 30 may include a receiving circuit (PEN RX) 31, first to third filters 32_1 to 32_3, a noise power calculating circuit 33, and a transmitting circuit (PEN TX) 34. The receiving circuit 31 may correspond to the receiving circuit 310 shown in FIG. 5, and the first to third filters 32_1 to 32_3 may respectively correspond to the first to third filters 321 to 323 shown in FIG. 5. The active pen 30 may further include a timing information generating circuit as described with reference to FIG. 5.

The receiving circuit 31 may receive the first to third uplink signals UL1 to UL3 through the touch panel 10. For example, as one example, the receiving circuit 31 may receive an uplink signal ULn=UL2 having the second frequency F2 in the second frame. The receiving circuit 31 may modulate the second uplink signal UL2 into an internal signal processible by the first to third filters 32_1 to 32_3, and may output the internal signal. In particular, each of the first to third filters 32_1 to 32_3 may be a filter for filtering a corresponding specific frequency component. The first filter 32_1 may generate a first sampling signal SS1 by sampling the internal signal at the first frequency F1, the second filter 32_2 may generate a second sampling signal SS2 by sampling the internal signal at the second frequency F2, and the third filter 32_3 may generate a third sampling signal SS3 by sampling the internal signal at the third frequency F3. Moreover, when the active pen 30 receives the second uplink signal UL2 having the second frequency F2, the first filter 32_1 may filter a noise component of the second uplink signal UL2 at the first frequency F1, the second filter 32_2 may filter a data component and a noise component of the second uplink signal UL2 at the second frequency F2, and the third filter 32_3 may filter a noise component of the second uplink signal UL2 at the third frequency F3.

Although FIG. 7 illustrates the first to third filters 32_1 to 32_3 which are for filtering at three different frequencies, that is, at the first to third frequencies F1 to F3, the inventive concept is not limited thereto. The active pen 30 may include two, four, or more filters for filtering at two, four, or more different frequencies. For example, the touch controller 20 may transmit an uplink signal having a frequency other than the first to third frequencies F1 to F3, and the active pen 30 may further include a filter for filtering other frequency components of the uplink signal.

The noise power calculating circuit 33 may receive the first to third sampling signals SS1 to SS3 and may calculate the power level of noise occurring at each of the first to third frequencies F1 to F3. The noise power calculating circuit 33 may transmit information about the power level of noise at a specific frequency to the transmitting circuit 34, and the transmitting circuit 34 may transmit information about the power level of noise to the touch controller 20 as a downlink signal DL. In an embodiment, when the power level of noise at a specific frequency among the first to third frequencies F1 to F3 is greater than or equal to a specific value for a preset number of frames, the noise power calculating circuit 33 may generate information about the power level of noise at the specific frequency, and the transmitting circuit 34 may transmit the information as a downlink signal DL.

Figure 8:
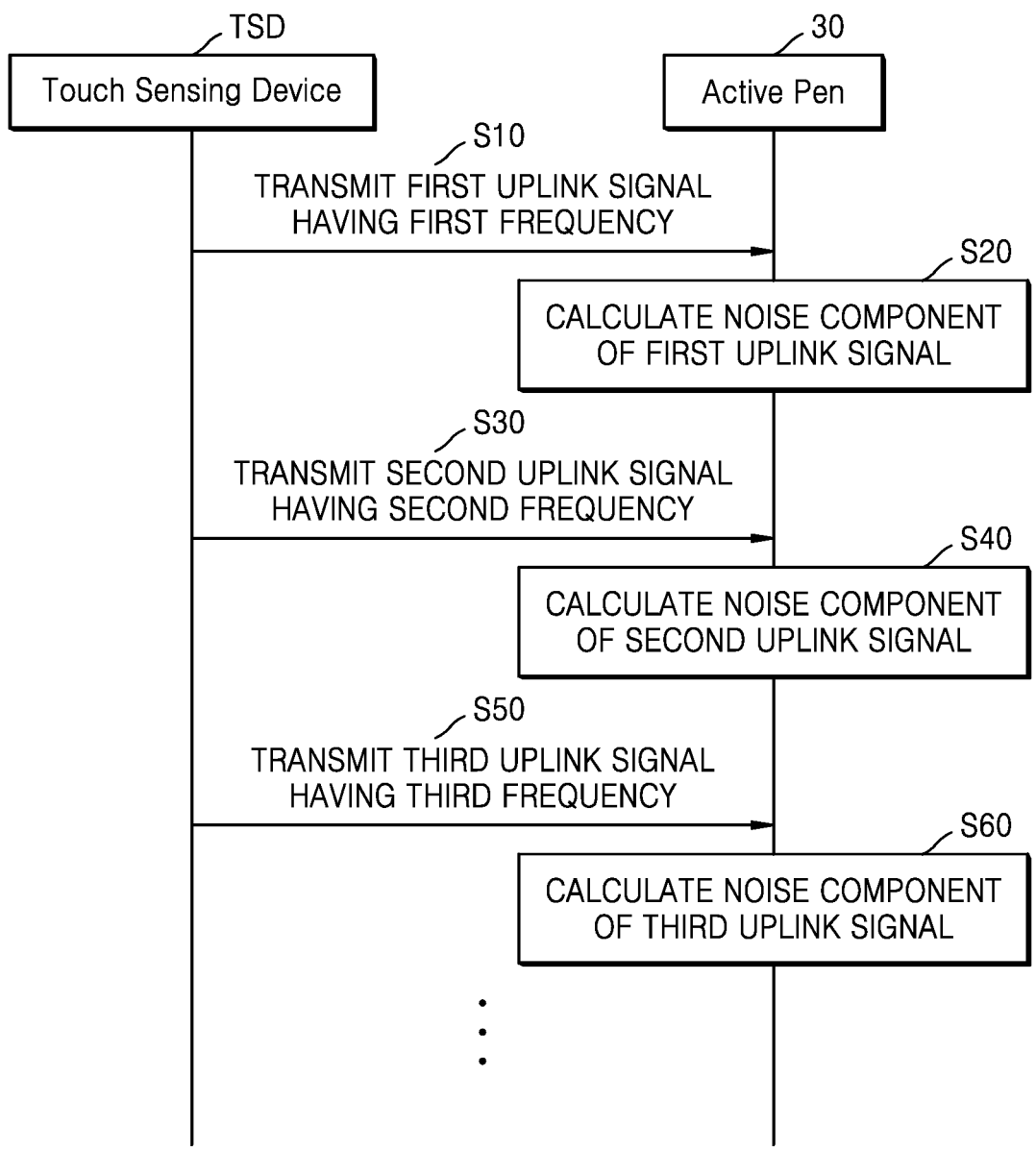
FIGS. 8 and 9 are flowcharts illustrating operations of a touch sensing device and an active pen according to embodiments.
Figure 9:
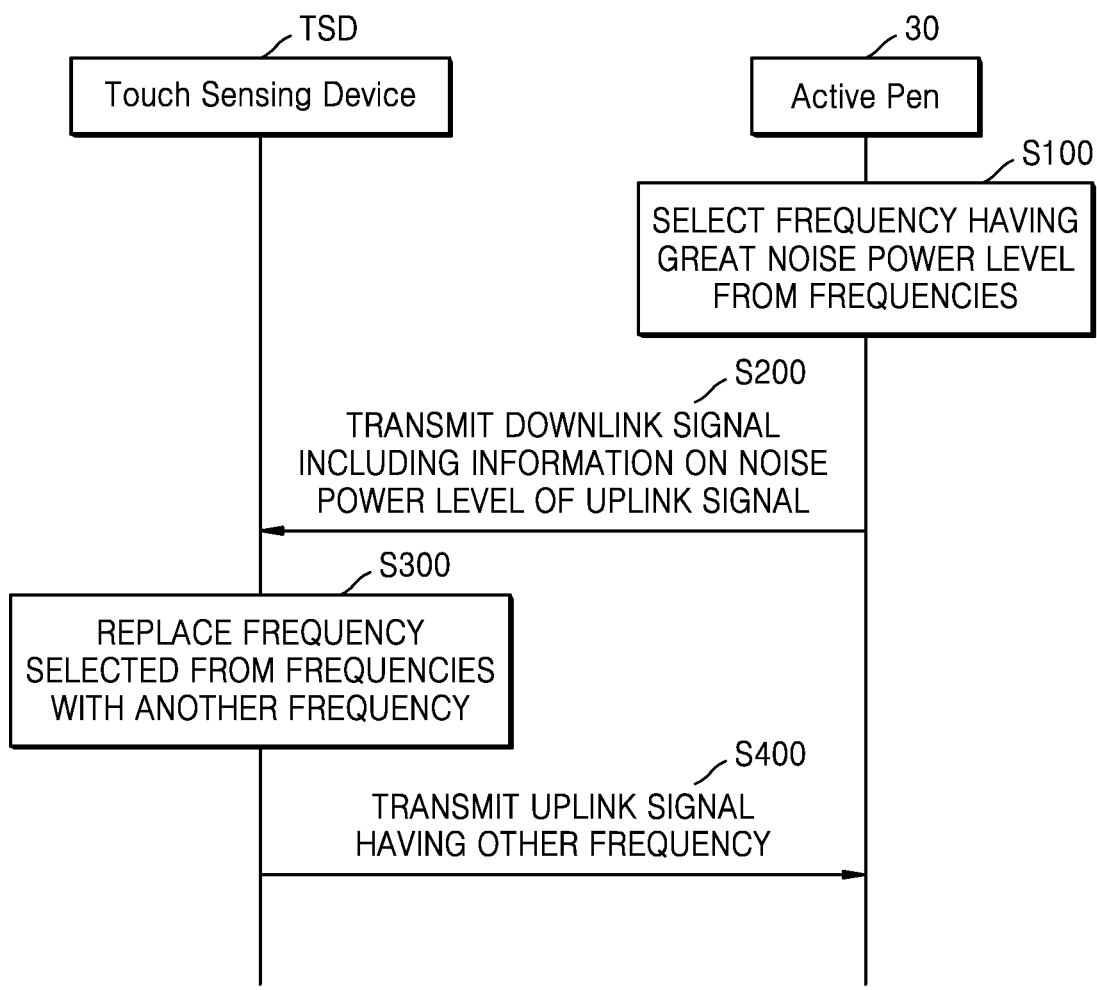

FIGS. 8 and 9 are flowcharts illustrating operations of a touch sensing device TSD and an active pen 30 according to embodiment; Operations S100 to S400 shown in FIG. 9 may be performed after operations S10 to S60 shown in FIG. 8 are performed. Referring to FIG. 8, in operation S10, the touch sensing device TSD may transmit a first uplink signal having a first frequency to the active pen 30. The active pen 30 may receive the first uplink signal. In operation S20, the active pen 30 may calculate a noise component of the first uplink signal. In operation S30, the touch sensing device TSD may transmit a second uplink signal having a second frequency to the active pen 30. The second frequency may be different from the first frequency. The active pen 30 may receive the second uplink signal. In operation S40, the active pen 30 may calculate a noise component of the second uplink signal. In operation S50, the touch sensing device TSD may transmit a third uplink signal having a third frequency to the active pen 30. The third frequency may be different from the first frequency and the second frequency. The active pen 30 may receive the third uplink signal. In operation S60, the active pen 30 may calculate a noise component of the third uplink signal.

In some embodiments, operations S10 and S20 may be performed in a first frame, operations S30 and S40 may be performed in a second frame, and operations S50 and S60 may be performed in a third frame. The second frame may be a frame following the first frame, and the third frame may be a frame following the second frame. However, embodiments are not limited thereto. Alternatively, in an embodiment, operations S10 to S60 may be performed within one frame. That is, the active pen 30 may receive first to third uplink signals within a single frame, and may analyze the first to third uplink signals having three different frequencies within the single frame.

After operation S60, operations S10 to S60 may be performed again. That is, in a next frame after the touch sensing device TSD transmits the third uplink signal, the touch sensing device TSD may transmit the first uplink signal having the first frequency, the second uplink signal having the second frequency, and the third uplink signal having the third frequency.

Referring to FIG. 9, the active pen 30 may calculate the power level of noise occurring at each of a plurality of frequencies, for example, the first to third frequencies. In operation S100, the active pen 30 may select a frequency having a great noise power level from the plurality of frequencies. For example, when a specific frequency among the plurality of frequencies has a noise power level equal to or greater than a specific value for a preset number of frames, the active pen 30 may select the specific frequency.

In operation S200, the active pen 30 may transmit a downlink signal including information about the noise power level of an uplink signal. For example, the downlink signal may include information about the specific frequency selected from the plurality of frequencies in operation S100, that is, information about the specific frequency (for example, the second frequency) having the greatest noise power level among the plurality of frequencies. However, the inventive concept is not limited thereto. For example, in operation S100, the active pen 30 may select a frequency having a relatively low noise power level among a plurality of frequencies, and in operation S200, the active pen 30 may transmit information about the selected frequency as a downlink signal.

The touch sensing device TSD may receive a downlink signal including information about the noise power level of an uplink signal. In operation S300, the touch sensing device TSD may select one of the plurality of frequencies, that is, the first to third frequencies, based on the information about a noise power level of the uplink signal, and may change the selected frequency to another frequency. For example, the second frequency among the first to third frequencies may be replaced with a fourth frequency that is different from the first to third frequencies.

For example, when the received information on the noise power level of the uplink signal includes information about a frequency having a high noise power level among a plurality of uplink signal frequencies, the touch sensing device TSD may select the frequency and replace the selected frequency with another frequency. Alternatively, for example, when the received information on the noise power level of the uplink signal includes information on a specific frequency having a low noise power level among a plurality of uplink signal frequencies, the touch sensing device TSD may select a frequency other than the specific frequency from the plurality of uplink signal frequencies and may replace the selected frequency with another frequency.

In operation S400, the touch sensing device TSD may transmit an uplink signal having the other frequency. The touch sensing device TSD may transmit an uplink signal having the other frequency in a frame after the first to third frames.

The touch sensing device TSD may sequentially transmit the first uplink signal having the first frequency, the second uplink signal having the second frequency, and the third uplink signal having the third frequency (in operations S10, S30, and S50) as described with reference to FIG. 8, and then the touch sensing device TSD may replace the second frequency with another frequency, for example, the fourth frequency (operation S300). Thereafter, the touch sensing device TSD may sequentially transmit a first uplink signal having the first frequency, an uplink signal having the other frequency, and a third uplink signal having the third frequency to the active pen 30. The active pen 30 may receive the uplink signal having the other frequency and may calculate the noise power level of the uplink signal having the other frequency.

Figure 10:
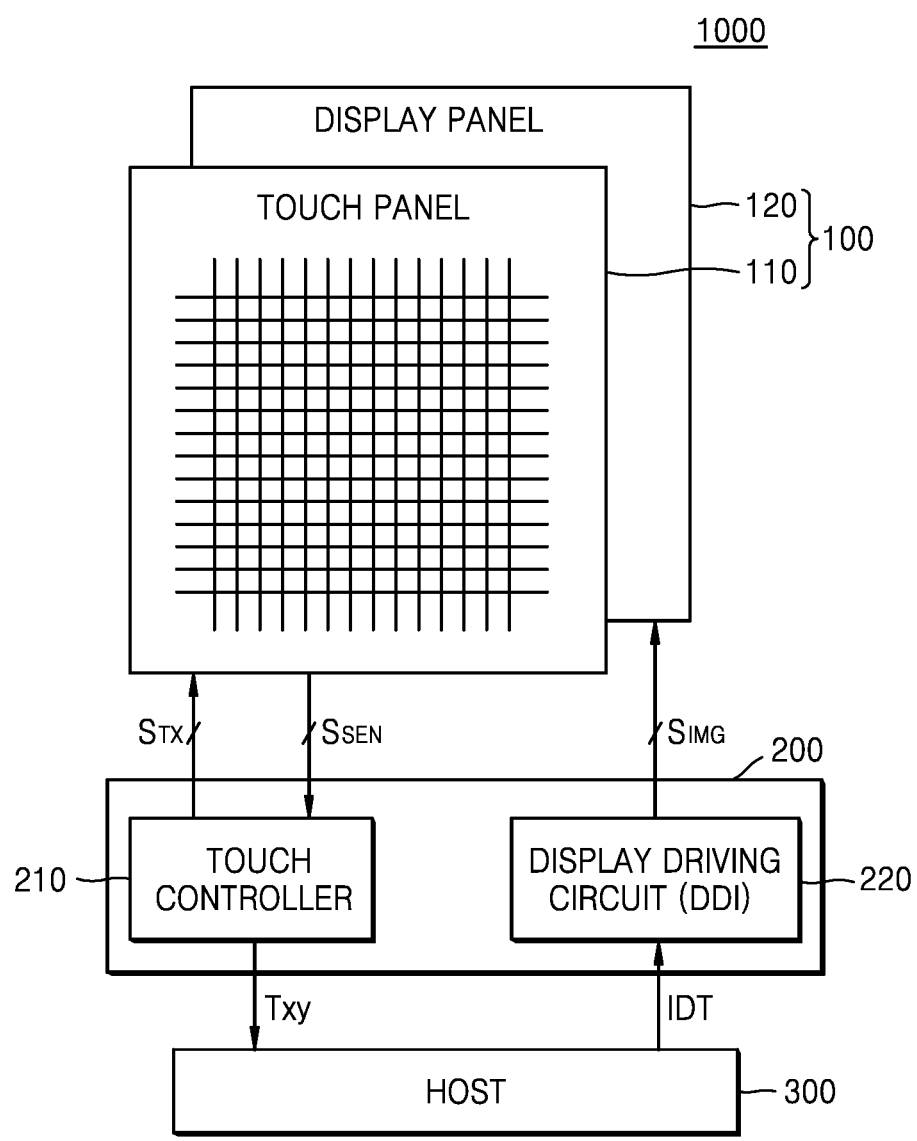
FIG. 10 is a block diagram illustrating a touch screen device according to an embodiment.

FIG. 10 is a block diagram illustrating a touch screen device 1000 according to an embodiment. The touch screen device 1000 may be included in various electronic devices, and may be referred to as a "touch sensing device (for example, refer to the touch sensing device TSD shown in FIG. 1)." For example, the touch screen device 1000 may be included in electronic devices such as a tablet personal computer (PC), an e-reader, a personal digital assistant (PDA), a portable multimedia player (PMP), a mobile terminal, a smartphone, a wearable device, an Internet of things (IoT) device, a refrigerator, and a navigation device. In addition, the touch screen device 1000 may be included in an electronic device, which is a component of a vehicle, furniture, manufacturing equipment, a door, a measuring device, and the like.

Referring to FIG. 10, the touch screen device 1000 may include a touch screen 100 and a touch screen driving circuit 200 configured to drive the touch screen 100. The touch screen 100 may include a touch panel 110 and a display panel 120, and may have a touch sensing function and a display function. The touch screen driving circuit 200 may include a touch controller 210 and a display driving circuit 220. Although FIG. 10 illustrates that the touch screen device 1000 includes a host 300, the inventive concept is not limited thereto, and the host 300 may be provided separately from the touch screen device 1000.

The touch screen 100 may display images and may receive user's touch inputs. The touch screen 100 may operate as an input/output device of an electronic device. In an embodiment, the touch screen 100 may further include a fingerprint sensor, and the touch screen device 1000 may perform a fingerprint recognition function. The touch panel 110 may sense touches (or touch inputs) on the touch screen 100 and may output sensing signals $S_{SEN}$. In this case, a touch may refer to the case in which a conductive object approaches the touch screen 100 as well as the case in which a conductive object (for example, a user's finger or palm, a touch pen, a stylus pen, an active pen, and the like) comes into direct contact with the touch screen 100. The touch panel 110 may be disposed on the display panel 120. The touch panel 110 may be attached to a front surface of the display panel 120 (for example, a surface of the display panel 120 through which optical signals are emitted). In an embodiment, the touch panel 110 may cover the front surface of the display panel 120.

The touch panel 110 may be implemented as a transparent panel having a touch-sensitive surface. Alternatively, the touch panel 110 may be implemented as a touch sensor array in which transparent electrodes are patterned. In the inventive concept, the touch panel 110 may be referred to as a "touch sensor array" or a "touch sensing layer." The touch panel 110 may include a plurality of touch electrodes arranged in a matrix. Sensing signals $S_{SEN}$ may be output through the touch electrodes by one of various touch sensing methods. In an embodiment, the touch electrodes may respectively output sensing signals $S_{SEN}$ by a capacitance sensing method or a mutual capacitance sensing method.

In some embodiments, the touch electrodes may include a plurality of driving electrodes and a plurality of receiving electrodes. For example, the touch panel 110 may include: (i) a plurality of driving electrodes through which a driving signal $S_{TX}$ is applied, and (ii) a plurality of receiving electrodes through which sensing signals $S_{SEN}$ are output. The driving electrodes may extend in a first direction, and the sensing electrodes may extend in a second direction. The driving electrodes and the sensing electrodes may cross each other, and mutual capacitance may be formed between the driving electrodes and the sensing electrodes.

In another embodiment, the touch electrodes may include a plurality of sensing electrodes. For example, the touch panel 110 may include a plurality of sensing electrodes arranged in a matrix, and each of the sensing electrodes may have capacitance. For example, capacitance may be formed between each of the sensing electrodes and ground (or a conductive layer in the touch screen 100), and the capacitance may be referred to as self-capacitance. A driving signal $S_{TX}$ may be applied to each of the sensing electrodes, and a sensing signal $S_{SEN}$ may be output from each of the sensing electrodes. In other words, each of the sensing electrodes may operate as a driving electrode and a receiving electrode.

A driving signal $S_{TX}$ may be applied through the driving electrodes, capacitance (for example, mutual capacitance or self-capacitance) may be formed based on the driving signal $S_{TX}$, and a sensing signal $S_{SEN}$ may be output through the receiving electrodes. When a conductive object, such as a human's finger or an active pen, touches or approaches an electrode, capacitance corresponding to the electrode may vary, and a sensing signal $S_{SEN}$ may be output from the touch panel 110 according to the varying capacitance. For example, the level of the sensing signal $S_{SEN}$ may increase or decrease compared to the level of the sensing signal $S_{SEN}$ before the touch occurs.

The display panel 120 may include a plurality of gate lines, a plurality of source lines, and a plurality of pixels arranged in a matrix respectively at points at which the gate lines and the source lines cross each other. As described above, the display panel 120 may include a "pixel array" or "display layer" including a plurality of pixels. The pixels may display an image based on an image signal $S_{IMG}$ received through the source lines and the gate lines. The image may be updated according to a set frame rate.

The display panel 120 may further include a common electrode disposed on the display layer. The common electrode may be provided between the display layer and the touch sensor array. The gate lines, the source lines, and the pixels may be formed in the display layer. A voltage common to the pixels of the display panel 120, for example, a ground voltage, may be applied to the common electrode. The display panel 120 may be implemented as one of a light emitting diode (LED) display, an organic LED (OLED) display, an active-matrix OLED (AMOLED) display, a liquid crystal display (LCD), an electrochromic display (ECD), a digital mirror device (DMD) display, an actuated mirror device (AMD) display, a grating light valve (GLV) display, a plasma display panel (PDP) display, an electro luminescent display (ELD), and a vacuum fluorescent display (VFD). In addition, the display panel 120 may be implemented as another type of display such as a flat panel display or a flexible panel display.

Although FIG. 10 illustrates that the touch panel 110 and the display panel 120 are separate components, the inventive concept is not limited thereto. For example, the touch screen 100 may be implemented using an in-cell-type panel in which the electrodes of the touch panel 110 and the pixels of the display panel 120 are combined with each other or an on-cell-type panel in which the electrodes of the touch panel 110 are arranged on the display panel 120.

The touch controller 210 may scan (for example, drive and sense) the touch panel 110. The touch controller 210 may provide a driving signal $S_{TX}$ to the touch panel 110, that is, the touch sensor array, and may receive a sensing signal $S_{SEN}$ generated based on the driving signal $S_{TX}$ from the touch panel 110. Based on the sensing signal $S_{SEN}$, the touch controller 210 may calculate whether a touch input has occurred, and a position at which the touch input has occurred, that is, a touch coordinate $T_{xy}$. Then, the touch controller 210 may provide the touch coordinate $T_{xy}$ to the host 300. In an embodiment, the touch controller 210 may calculate touch pressure and may provide the touch pressure to the host 300 together with the touch coordinate $T_{xy}$.

In an embodiment, the touch controller 210 may transmit a plurality of uplink signals having different frequencies for communication between the touch screen device 1000 and an active pen. For example, in a first frame, the touch controller 210 may transmit a first uplink signal having a first frequency, and in a second frame, the touch controller 210 may transmit a second uplink signal having a second frequency. Furthermore, in a third frame, the touch controller 210 may transmit a third uplink signal having a third frequency. The first to third uplink signals may include the same information, and the first to third frequencies may be different from each other.

The display driving circuit 220 may receive image data IDT from the host 300 and may drive the display panel 120 to display an image on the display panel 120 according to the image data IDT. The display driving circuit 220 may convert the image data IDT into analog image signals $S_{IMG}$, and may provide the analog image signals $S_{IMG}$ to corresponding pixels of the display panel 120. The touch controller 210 and the display driving circuit 220 may transmit and receive synchronization signals, state information, and the like.

The host 300 may perform an overall control operation for the touch screen device 1000. The host 300 may generate data related to a display operation and may provide the data to the display driving circuit 220. In addition, the host 300 may receive from the touch controller 210, information such as the occurrence of a touch, a touch coordinate $T_{xy}$, and touch pressure (intensity), and based on the information, the host 300 may interpret the touch and may perform a control operation according to the touch coordinate $T_{xy}$ and the touch intensity.

In an embodiment, the host 300 may include an application processor (AP), and the AP may be implemented as a system-on-chip (SoC). The SoC may include a system bus (not shown) to which a protocol having standard bus specifications is applied, and may include various pieces of intellectual property (IP) connected to the system bus. Various standards, such as the advanced microcontroller bus architecture (AMBA) protocol by Advanced RISC Machines (ARM), may be applied as standards of the system bus.

Figure 11:
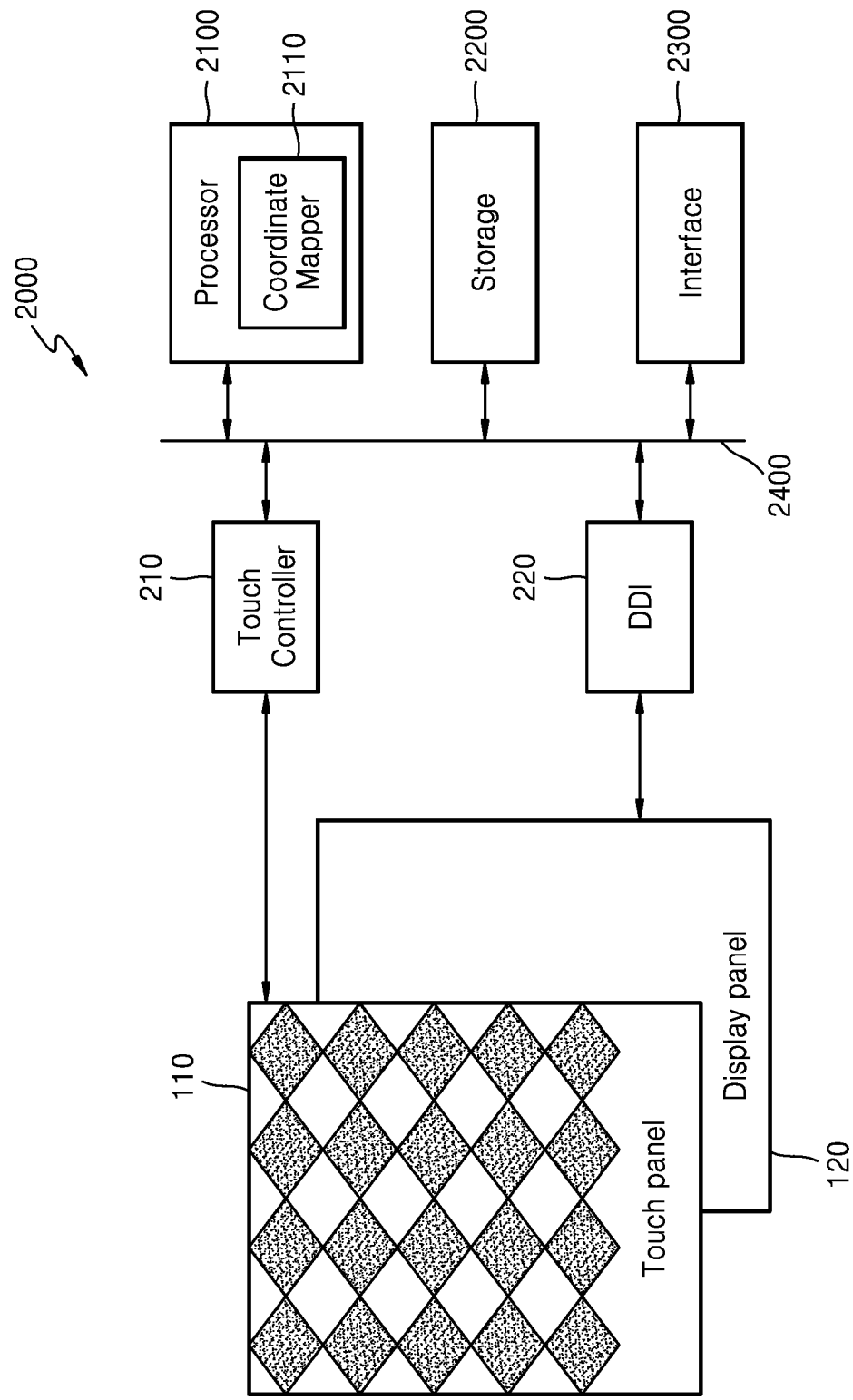
FIG. 11 is a block diagram illustrating a touch screen system according to an embodiment.

FIG. 11 is a block diagram illustrating a touch screen system 2000 according to an embodiment. Referring to FIG. 11, the touch screen system 2000 may include a touch panel 110, a display panel 120, a touch controller 210, a display driving circuit 220 (display driver IC (DDI)), a processor 2100, a storage 2200, an interface 2300, and a bus 2400. The touch panel 110 is configured to detect a touch event occurring at each point. The display panel 120 may include various types of panels such as an LED panel, an OLED panel, or an LCD panel configured to display images. The touch panel 110 and the display panel 120 may be integrated and overlap each other. The touch controller 210 may control operations of the touch panel 110 and may transmit outputs of the touch panel 110 to the processor 2100.

The display driving circuit 220 controls the display panel 120 to display images on the display panel 120. The display driving circuit 220 may include a source driver, a grayscale voltage generator, a gate driver, a timing controller, a power supply, and an in-image interface. Image data to be displayed on the display panel 120 may be stored in a memory through an image interface and may be converted into an analog signal using a grayscale voltage generated by the grayscale voltage generator. The source driver and the gate driver may drive the display panel 120 in response to a vertical synchronization signal and a horizontal synchronization signal that are provided from the timing controller.

The processor 2100 may execute instructions and control the overall operation of the touch screen system 2000. Program code or data, which the processor 2100 requires, may be stored in the storage 2200. The interface 2300 may communicate with any external device and/or system. The processor 2100 may include a coordinate mapper 2110. Positions on the touch panel 110 and positions on the display panel 120 may be mapped to each other, and the coordinate mapper 2110 may extract a coordinate of the display panel 120 corresponding to a touch point at which a touch input occurs on the touch panel 110. Owing to this coordinate mapping between the touch panel 110 and the display panel 120, a user may perform an input action such as touching, dragging, pinching, stretching, or single or multiple touching to select an icon, a menu item, or an image displayed on the display panel 120.

In an embodiment, the touch screen system 2000 may be a smart home appliance having an image display function. Examples of the smart home appliance may include at least one selected from the group consisting of a TV, a digital video disk (DVD) player, an audio system, a refrigerator, an air conditioner, a vacuum cleaner, an oven, a microwave oven, a washing machine, an air purifier, a set-top box, a TV box (for example, Samsung HomeSync™, Apple TV™, or Google TV™), a game console, an electronic dictionary, an electronic key, a camcorder, and an electronic picture frame.

In an embodiment, the touch screen system 2000 may include at least one selected from the group consisting of various medical devices (for example, magnetic resonance angiography (MRA) devices, magnetic resonance imaging (MRI) devices, computed tomography (CT) devices, imaging devices, ultrasound machines, etc.), navigation devices, global positioning system (GPS) receivers, event data recorders (EDRs), flight data recorders (FDRs), automotive infotainment devices, marine electronic equipment (such as marine navigation devices, gyro compasses, etc.), avionics, security devices, vehicular head units, industrial or domestic robots, automatic teller machines (ATMs) in financial institutions, and point of sale (POS) systems in stores.

In an embodiment, the touch screen system 2000 may include at least one selected from the group consisting of parts of furniture or buildings/structures having an image display function, electronic boards, electronic signature receiving devices, projectors, and various measuring devices (for example, water meters, electricity meters, gas meters, radio wave measuring instruments, etc.). In various embodiments, an electronic device including the touch screen system 2000 may include one or a combination of the devices listed above. In addition, the touch screen system 2000 may be a flexible device. In various embodiments, those skilled in the art will apparently understand that the touch screen system 2000 is not limited to the devices listed above.

While the inventive concept has been particularly shown and described with reference to embodiments thereof, it will be understood that various changes in form and details may be made therein without departing from the spirit and scope of the following claims.

What is claimed is:

1. An active pen adapted for use with a touch pad, said active pen comprising:
   a receiving circuit configured to generate an internal signal in response to modulating a received uplink signal;
   a first filter configured to generate a first sampling signal by sampling the internal signal at a first frequency;
   a second filter configured to generate a second sampling signal by sampling the internal signal at a second frequency unequal to the first frequency;
   a noise power calculating circuit;
   a timing information generating circuit configured to generate timing information associated with the uplink signal from the internal signal; and
   a transmitting circuit configured to: (i) receive information associated with a noise power level at a specific frequency among the first and second frequencies, and (ii) transmit the information that was received as a downlink signal to a device external to the active pen,
   wherein the receiving circuit is configured to receive the uplink signal at the first frequency in a first frame, and at the second frequency in a second frame,
   wherein the uplink signal in the first frame and the uplink signal in the second frame include equivalent information for communication, and
   wherein the noise power calculating circuit is configured to calculate the noise power level of the uplink signal at each of the first and second frequencies, in response to the information within the uplink signal in the first frame, and the information within the uplink signal in the second frame.

2. The active pen of claim 1, wherein the active pen further comprises a third filter configured to generate a third sampling signal by sampling the internal signal at a third frequency, which is unequal to the first and second frequencies; wherein the receiving circuit is configured to receive the uplink signal at the third frequency in a third frame; and wherein the uplink signal in the first frame and the uplink signal in the third frame include equivalent information for communication.

3. The active pen of claim 2, wherein the noise power calculating circuit is configured to calculate the noise power level of the uplink signal at each of the first and second frequencies and a noise power level of the uplink signal at the third frequency, in response to the first, second and third sampling signals, respectively.

4. The active pen of claim 3,
   wherein the transmitting circuit is further configured to receive information associated with the noise power level at the third frequency frequencies, from the noise power calculating circuit.

5. The active pen of claim 3, wherein the noise power calculating circuit is configured to select a frequency associated with a relatively greater noise power level from the first, second and third frequencies, and output information associated with the selected frequency.

6. The active pen of claim 2, wherein the second frame is a frame following the first frame and the third frame is a frame following the second frame.

7. The active pen of claim 2, wherein, in a specific frame between the first frame and the second frame, the receiving circuit is configured to receive an uplink signal having the first frequency; and wherein the uplink signal in the first frame and the uplink signal in the specific frame include identical information that is out of phase relative to each other.

8. The active pen of claim 2, wherein the first, second and third filters each comprise a discrete Fourier transform (DFT) filter.

9. The active pen of claim 1, wherein the uplink signal includes a preamble code and a command identification (ID).

10. A touch controller, comprising:
    a transmitting circuit configured to transmit, to an active pen, an uplink signal having a first frequency in a first frame, and an uplink signal having a second frequency unequal to the first frequency in a second frame;

a receiving circuit configured to receive a downlink signal provided by the active pen, said downlink signal including information on a noise power level associated with at least one of the uplink signal having the first frequency and the uplink signal having the second frequency; and a touch processor configured to control the transmitting circuit based on the information on a noise power level, such that an uplink signal having a frequency that is different from the first and second frequencies is transmitted in a frame after the first and second frames, wherein the uplink signal in the first frame and the uplink signal in the second frame include equivalent information for communication.

11. The touch controller of claim 10, wherein the transmitting circuit is further configured to transmit, to the active pen, an uplink signal having a third frequency in a third frame; and wherein the first, second and third frames are spaced apart in time relative to each other.

12. The touch controller of claim 10, wherein, in a specific frame between the first frame and the second frame, the transmitting circuit is configured to transmit an uplink signal having the first frequency; and wherein the uplink signal in the first frame and the uplink signal in the specific frame comprise equivalent information, but are out of phase with each other.

13. The touch controller of claim 10,
wherein the transmitting circuit comprises a plurality of transmitters configured to provide a driving signal to driving electrodes within a touch panel; and
wherein the receiving circuit comprises a plurality of receivers configured to receive a sensing signal from receiving electrodes within the touch panel.

14. The touch controller of claim 11, wherein, in the first, second, and third frames, the uplink signals comprise equivalent information, but have different frequencies.

15. The touch controller of claim 10, wherein each of the uplink signals includes a preamble code for synchronizing transmission timing with the active pen and a command identification (ID) for assigning an ID to the active pen.

16. A method of operating an active pen adapted for use with a touch pad, the method comprising:
receiving a first uplink signal having a first frequency;
calculating a power level of noise occurring in the first uplink signal;
receiving a second uplink signal having a second frequency unequal to the first frequency;
calculating a power level of noise occurring in the second uplink signal;
receiving a third uplink signal having a third frequency unequal to the first and second frequencies;
calculating a power level of noise occurring in the third uplink signal; and
transmitting information associated with the power level of noise at a specific frequency among the first, second, and third frequencies as a downlink signal to a device external to the active pen,
wherein the first uplink signal, the second uplink signal, and the third uplink signal include equivalent information for communication, which is used during said calculating the power level of noise occurring in the first, second and third uplink signals.

17. The method of claim 16, further comprising transmitting a downlink signal comprising information on the power levels of noise in the first, second, and third uplink signals.

18. The method of claim 17, wherein the downlink signal comprises information on a frequency having a greatest noise power level among the first, second, and third frequencies.

19. The method of claim 16, wherein the first uplink signal is received in a first frame, the second uplink signal is received in a second frame, and the third uplink signal is received in a third frame; and wherein the first, second and third frames are spaced apart in time relative to each other.

20. The method of claim 16, further comprising receiving an uplink signal having a frequency that is different from the first, second and third frequencies.

* * * * *